June 19, 1962 — J. J. KOPITZKI — 3,039,732
ADJUSTABLE VEHICLE SEAT
Filed Dec. 2, 1958 — 2 Sheets-Sheet 1
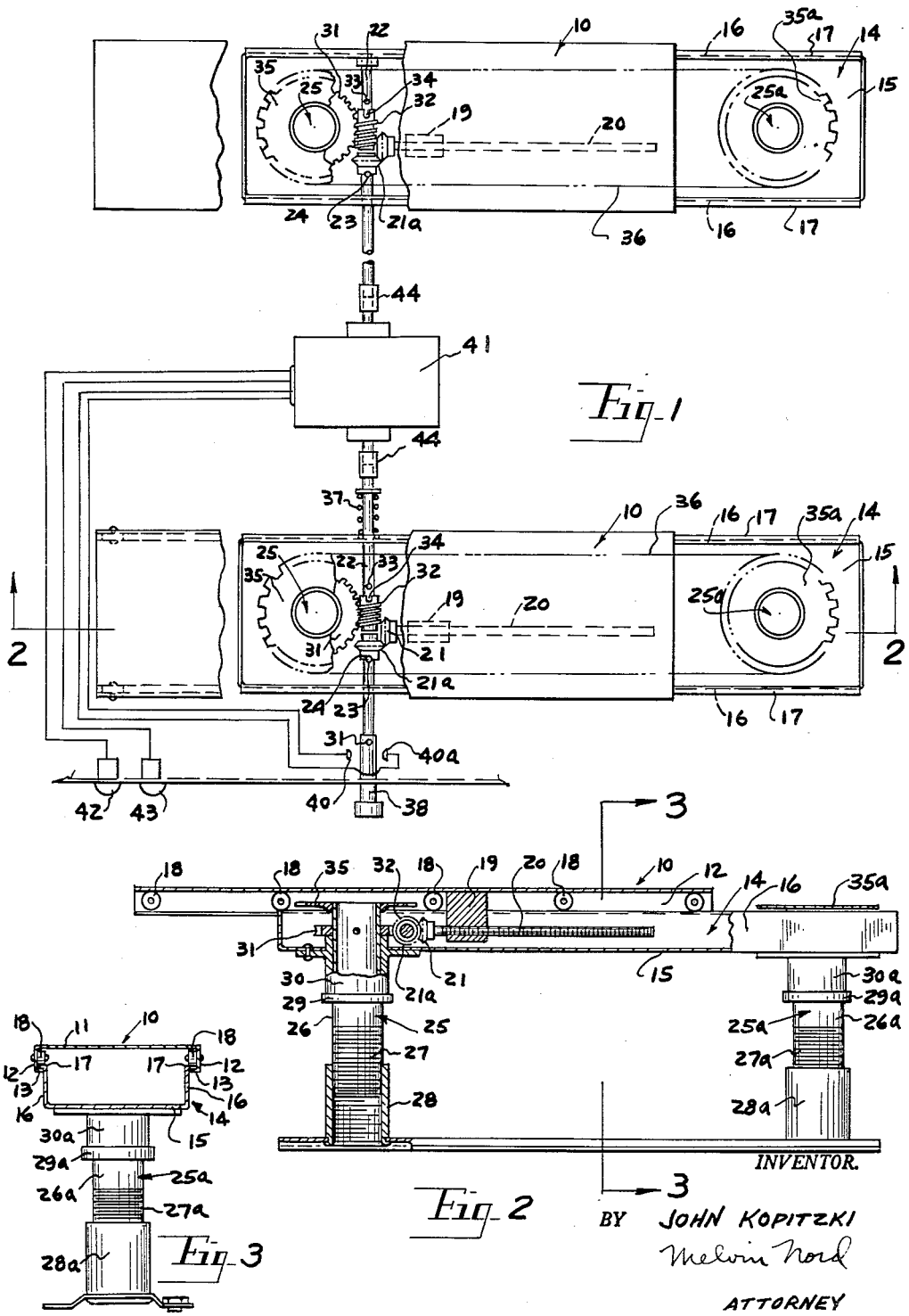
INVENTOR.
BY JOHN KOPITZKI
Melvin Nord
ATTORNEY June 19, 1962   J. J. KOPITZKI   3,039,732
ADJUSTABLE VEHICLE SEAT
Filed Dec. 2, 1958   2 Sheets-Sheet 2

INVENTOR.
JOHN KOPITZKI
BY Melvin Nord
ATTORNEY

United States Patent Office 3,039,732
Patented June 19, 1962

3,039,732
ADJUSTABLE VEHICLE SEAT
John J. Kopitzki, Detroit, Mich.
(1249 SW. 137th St., Seattle, Wash.)
Filed Dec. 2, 1958, Ser. No. 777,735
6 Claims. (Cl. 248—404)

This invention relates to improved seats for motor vehicles, and particularly to adjustable vehicle seats. More specifically, the invention relates to motor vehicle seats which are adapted to be raised or lowered, and to be moved forward or backward. In one embodiment of the invention, single seats may be swivelled in addition.

An object of the invention is to provide a device of this type which is readily adaptable for use either in swivel seats or in conventional non-swivel seats.

Another object of the invention is to provide a device of this type which is low in cost, consisting primarily of standard parts.

A further object of the invention is to provide a vehicle seat adjuster which permits variation of the amount of tilt of the seat.

Another object of the invention is to provide a swivel seat which is adjustable insofar as elevation and forward position are concerned.

Still another object of the invention is to provide means for adjusting vehicle seats which is adaptable either to manual or motorized operation.

Other objects and advantages will more fully appear from the following description and drawings, wherein are disclosed preferred embodiments of the invention.

In the drawings:

FIG. 1 is a cutaway plan view, showing an embodiment in which a conventional non-swivel seat is adjustable by means of motorized operation.

FIG. 2 is a sectional view taken along the line 2—2 of FIG. 1.

FIG. 3 is a sectional view taken along the line 3—3 of FIG. 1.

Figure 4:
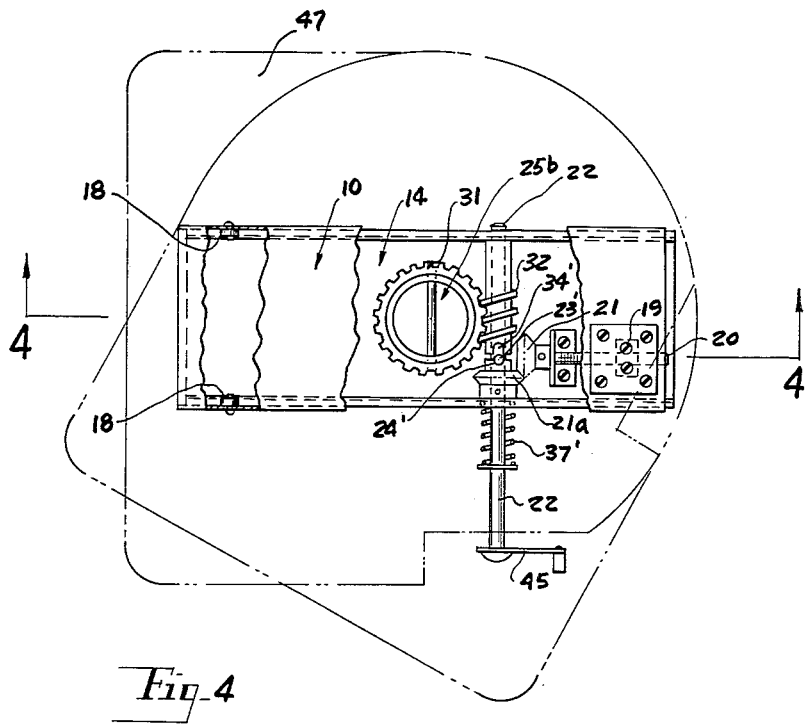
FIG. 4 is a cutaway plan view of a second embodiment of the invention, showing a swivel seat, manually operated.

Referring now to the drawings, wherein similar parts are represented by similar numerals, FIGS. 1–3 show an embodiment of the invention in which a conventional non-swivel seat (not shown) is mountable on a pair of forwardly and backwardly movable upper channels 10, 10. Said upper channels 10, 10 are, as shown, situated with their webs 11 horizontal and uppermost, and with their flanges 12 depending downwardly therefrom and being turned inwardly at their lower ends, thereby forming guides 13. The vehicle seat may be fastened to the upper surface of webs 11 in any suitable known manner, and will thus partake of the forward and backward, and upward and downward motion, of upper channels 10, 10.

Said upper channels 10, 10 are in general mounted above corresponding lower channels 14, 14, the latter, however, being capable only of upward and downward motion (as described below), but not of forward and backward motion. Said lower channels 14, 14 are, as shown, situated with their webs 15 horizontal and lowermost, and with their flanges 16 projecting upwardly therefrom and being turned outwardly at their upper ends, thereby forming tracks 17. Said tracks 17 are adapted to overlie the aforesaid guides 13. The web 11 of upper channel 10 is spaced apart from lower channel 14, and in particular from the tracks 17 thereof, by means of a plurality of rollers 18, which are rotatably fastened to the flanges 12 of upper channels 10 in any suitable known manner. Thus, the rollers 18 ride on tracks 17 and, as they rotate, facilitate the forward and backward translational motion of upper channels 10, 10 relative to the corresponding lower channels 14, 14.

The aforesaid forward and backward translational motion of said upper channel 10 is caused by the corresponding translational motion of a nut 19 threaded onto a lead screw 20 which is rotatably mounted on the upper side of the web 15 of lower channel 14. Said nut 19 is fastened to upper channel 10 in any suitable manner, so as to cause channel 10 to move backward and forward jointly with nut 19, as nut 19 is caused to advance and recede along lead screw 20 by the latter's rotation. Preferably, nut 19 is removably fastened to the web 11 of upper channel 10.

The rotation of said lead screw 20 is in turn caused by the rotation of bevel gears 21, 21a. Gear 21 is fastened to the inner end of lead screw 20, and meshes at right angle with gear 21a. The latter gear 21a is constantly engaged with its mating gear 21, but runs freely on drive shaft 22. That is to say, gear 21a slips loosely over drive shaft 22, so that rotation of drive shaft 22 is not in itself sufficient to cause the rotation of gear 21a. In order to cause rotation of gear 21a, and hence backward or forward motion of upper channel 10, it is necessary that the boss 23 projecting from drive shaft 22 engage the corresponding recess 24 at the rear of gear 21a. This is accomplished by causing drive shaft 22 to be moved longitudinally in the appropriate direction until boss 23 enters recess 24. When this occurs, rotation of drive shaft 22 will cause forward or backward translational motion of upper channel 10, depending on the direction of rotation of drive shaft 22.

Raising and lowering of the vehicle seat is accomplished, in general, by means of jack screws 25, 25a. Said jack screws 25, 25a comprise vertical jack shafts 26, 26a, with male threads 27, 27a at the lower ends thereof. Said male threads 27, 27a rotatably engage corresponding female threads of vertical collar 28, 28a, which are rigidly fastened to the vehicle in any suitable manner. Above the threaded portion of each jack shaft 26, 26a at a point intermediate the ends, is a supporting collar 29, 29a. Said supporting collar supports a collar bearing 30, 30a, within which the upper portion of the jack shaft 26, 26a is free to rotate. As shown, the collar bearings are suitably attached to the lower channels 14, and do not rotate. The jack shafts 26, 26a extend upwardly through suitable openings in the web 15 of the lower channels 10. Firmly attached to each of said jack shafts 26, 26a, in the same plane as the aforesaid drive shaft 22, is a toothed wheel 31, adapted to mesh at right angles with a worm gear 32. The worm gear 32 is constantly engaged with the toothed wheel 31, but runs freely on drive shaft 22. That is to say, worm gear 32 slips loosely over shaft 22, so that rotation of drive shaft 22 is not in itself sufficient to cause rotation of the worm gear 32. In order to cause rotation of the worm gear, and hence upward or downward motion of lower channel 10 as the jack shaft 26 rotates, it is necessary that the boss 33 projecting from drive shaft 22 engages the corresponding recess 34 at the rear of worm gear 32. This is accomplished by causing drive shaft 22 to be moved longitudinally in the appropriate direction until boss 33 enters recess 34. When this occurs, rotation of drive shaft 22 will cause rotation of jack shaft 26 and hence upward or downward motion of lower channel 14, depending on the direction of rotation of drive shaft 22.

It is of course necessary that the worm gear 32 and the bevel gear 21a be independently rotatable, so that the upward and downward motion of the seat will be independent of the forward and backward motion. For this reason, it is preferable for some gap to be left between these two gears, in order to prevent rotation of one from dragging the other around with it by friction.

At the top of jack shaft 26 is fixed a sprocket 35; another sprocket 35a is fixed at the top of jack shaft 26a.

This pair of sprockets 35, 35a is interconnected by means of a drive chain 36. Thus when the worm gear 32 is engaged with toothed wheel 31 and drive shaft 22 is rotated, both jack shafts 25, 25a are simultaneously operated.

If it is desired to maintain a fixed angle of tilt of the vehicle seat, jack shafts 25 and 25a and sprockets 35, 35a will preferably be identical in design, so that both the front and rear of the vehicle seat will be raised or lowered to the same extent. On the other hand, if it is desired to vary the angle of tilt, as the elevation of the seat is varied, this is readily accomplished by employing differences in sprocket design or in jack shaft design. For example, sprocket 35a may have a different diameter from sprocket 35, or the pitch of threads 27a, 28a may be different from those of threads 27, 28.

The embodiment shown in FIGS. 1–3 thus employs four jack shafts as supporting posts for a vehicle seat, such as the front seat of an automobile. The two jack shafts 25 will be at opposite ends of the vehicle seat (as will the two jack shafts 25a); one pair will support the forward part of the seat and the other the rear part of the seat.

In order to operate the vehicle seat adjuster described in FIGS. 1–3 it is necessary to provide for longitudinal motion and for rotation of drive shaft 22. A coil spring 37 may be employed to bias drive shaft in one direction or another, e.g. in the direction of engagement of the bevel gear 32, as shown in FIG. 1. When it is desired to move the drive shaft into position for engagement of the other gear (i.e. the worm gear 21a) this can readily be done by pulling plunger 38 outwardly. In the outer position, the worm gear 32 is mechanically engaged. In order to raise or lower the seat, it is now necessary to rotate the drive shaft 22 in one direction or the other. This may, for example, be accomplished by rotating plunger 38 (in its outer position) into one of two positions in which an electrical contact 39 on plunger 38 touches an electrical contact 40 or 40a which closes an appropriate electrical circuit (indicated only schematically) to cause rotation of an electrical motor 41 in the desired direction. When it is desired to stop the resulting raising or lowering of the seat, one simply moves the plunger 38 to a neutral position and lets it go, whereupon it is pulled by spring 37 into the position of engagement of the bevel gear and away from electrical contacts 40, 40a.

When, on the other hand, it is desired to move the seat backwards or forwards, one simply pushes button 42 or 43 (depending on the direction desired). These buttons close electrical circuits (indicated schematically only), to cause rotation of motor 41 in the desired direction, thus causing forward or backward motion of the seat.

In the embodiment shown in FIGS. 1–3, it is of course necessary to use shaft couplings 44, 44 between the motor shaft and the drive shaft 22 which permit sufficient longitudinal motion of the drive shaft 22 to enable either position to be reached, without disengagement of the shafts.

Figure 5:
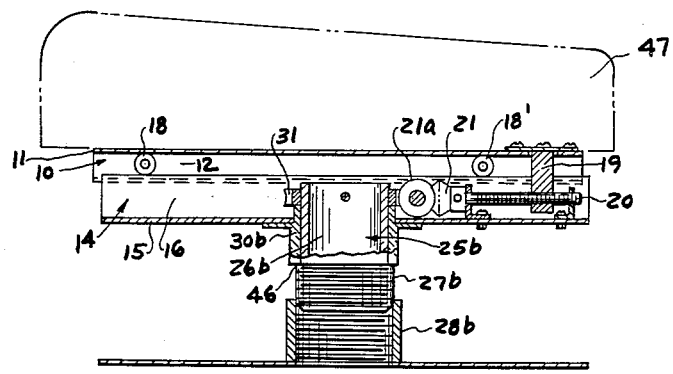
FIG. 5 is a cross-sectional view taken along the line 4—4 of FIG. 4.

A second preferred embodiment of the invention is shown in FIGS. 4 and 5. The invention is here employed in connection with a swivel seat. The principal change is that a single jack screw 25b is employed, instead of four jack screws. The reasons for this are firstly, because swivel seats are inherently single seats rather than multiple seats, and secondly, because the use of a single jack screw makes rotation or swiveling of the seat possible, the rotation taking place about the single jack screw 25b. Since there is here no need for one jack shaft to drive another, the chain and sprockets used in FIGS. 1–3 are also eliminated. Otherwise, the features of both embodiments may be the same.

In view of the fact that a single jack screw is used in the embodiment shown in FIGS. 4 and 5, it may be desirable to increase its diameter as shown; however, this is a matter of design only, and it may be preferred to standardize on a single diameter for both applications.

Another change shown in FIGS. 4 and 5 (which may be applied equally as well in other embodiments, such as that shown in FIGS. 1–3) is that here the operation is manual, rather than electrical, by means of a crank 45 which may be moved in or out, and which may be rotated in either direction.

In the embodiment shown in FIGS. 4 and 5, the coil spring 37' has been placed on the opposite side. (This is, of course, a mere matter of choice in design.) Furthermore, a single boss 23' is employed on drive shaft 22, instead of two such bosses, and the recesses 24' and 34' in the bevel and worm gears face each other. With this design, it is advantageous for the worm gear 32 and bevel gear 21a to extend to the flanges 16 of the lower channel 14, as shown in FIG. 4. (This feature, also, is equally applicable to non-swivel seats.)

Another change shown in FIGS. 4 and 5, which is equally applicable to non-swivel seats, is that the jack shaft 26b has no supporting collar (such as 29 or 29a) above the threaded portion but is instead turned down to a smaller diameter. Thus, the collar bearing 30b rests on the shoulder 46 thus formed.

In FIGS. 4 and 5, the swivel seat 47 is shown in its normal position in solid lines, and in a rotated position in dashed lines. Rotation or swiveling may be accomplished either by turning the seat by hand, or when sitting in the seat, by the action of the feet on the floor. If desired, known means (not shown) may be employed for biasing the seat to one position or another, in the absence of such exertion of force.

Other modifications in the details of construction may also be made without departing from the spirit of the invention, the principal novel features of which are set forth below.

I claim:

1. An adjustable swivel seat for vehicles comprising (1) a seat frame; (2) jack shaft means for raising and lowering said frame; (3) a bearing mounted on said jack shaft; and (4) independent means attached to said bearing for moving said frame horizontally with respect thereto; wherein said bearing is free to rotate, and thereby to rotate said seat frame independently of other motions.

2. An adjustable vehicle seat comprising: (1) a seat frame; (2) jack shaft means for raising and lowering said frame; (3) a bearing mounted on said jack shaft; and (4) independent means attached to said bearing for moving said frame horizontally with respect thereto; wherein the means for moving said frame horizontally comprise: (1) a lower longitudinal horizontal member rigidly attached to said bearing; (2) a trackway rigidly supported by said lower longitudinal member; (3) an upper longitudinal horizontal member rigidly fastened to said seat frame, and adapted to ride on said trackway; and (4) independent means for moving said upper longitudinal member along said trackway, thereby moving said frame horizontally; and wherein the means for moving said upper longitudinal member along said trackway comprise: (1) a lead screw rotatably mounted on said lower longitudinal member and running substantially parallel thereto; (2) a nut adapted to run on said lead screw as the latter is rotated; (3) means for rigidly fastening said nut to said upper longitudinal member; and (4) means for rotating said lead screw in clockwise and counterclockwise directions, thereby causing said upper longitudinal member to move backwardly and forwardly along said trackway.

3. The adjustable vehicle seat set forth in claim 2, further provided with: (1) a drive shaft, rotatably mounted transversely across said lower longitudinal member; (2) a worm-and-toothed wheel gear set for rotating said jack shaft, said toothed wheel rigidly fastened around said jack shaft adjacent its upper end, and said worm gear being mounted for free rotation on said drive shaft and adapted for engagement with said toothed wheel; (3) a bevel gear set for rotating said lead screw, one of said bevel gears being rigidly mounted at the end of said lead screw and the other being mounted for free rotation on said drive shaft and adapted for engagement with the other bevel gear; (4) at least one boss projecting from said drive shaft at a point intermediate the flanges of said lower longitudinal member; (5) a recess in each of said gears mounted on said drive shaft, adapted to receive said boss; (6) means for moving said drive shaft back and forth along its own longitudinal axis, sufficient to permit engagement and disengagement of said boss with the recesses in each of the gears mounted on said drive shaft, thereby engaging and disengaging said gears individually with their corresponding gears; and (7) means for rotating said drive shaft.

4. A non-swivelling adjustable vehicle seat comprising: (1) a seat frame; (2) a plurality of jack screw means for raising and lowering the frame, each comprising a rotatable jack shaft and a mating threaded member rigidly fastened to the vehicle, with respect to which said jack shaft is adapted to be rotated; (3) a bearing mounted on each such jack shaft; and (4) means attached to said bearings for moving said frame horizontally with respect thereto, said means being operable independently of the operation of the aforesaid jack screw means.

5. An adjustable vehicle seat comprising: a seat frame; jack shaft means for raising and lowering said frame; a bearing mounted on said jack shaft; and means attached to said bearing for moving said frame horizontally with respect thereto, said horizontal moving means comprising a lower longitudinal horizontal member rigidly attached to said bearing, an upper longitudinal horizontal member rigidly fastened to said seat frame, trackway means supported on one of said horizontal members, and means for causing relative motion between the other of said horizontal members and said trackway thereby moving said frame horizontally, said means for causing relative motion between said trackway and said other horizontal member comprising a lead screw rotatably mounted on one of said longitudinal horizontal members and running substantially parallel thereto, a nut adapted to run on said lead screw as the latter is rotated, means for rigidly fastening said nut to the other of said longitudinal horizontal members, and means for rotating said lead screw in clockwise and counterclockwise directions, thereby causing relative motion between said longitudinal horizontal members.

6. An adjustable seat for a vehicle, comprising: (1) a seat frame; (2) jack shaft means for raising and lowering said frame and comprising at least one substantially vertical upwardly and downwardly movable jack shaft and a corresponding substantially vertical fixed support member rigidly attached to said vehicle, said jack shaft and support member being adapted to telescope upon vertical translational motion of said jack shaft with respect to said support member; (3) a bearing mounted on said jack shaft and constrained to move upwardly and downwardly jointly with said jack shaft without relative translational motion therebetween; and (4) independent means attached to said bearing for moving said frame horizontally with respect thereto, wherein the means for moving said frame horizontally comprise: (1) a lower longitudinal horizontal member rigidly attached to said bearing; (2) a trackway rigidly supported by said lower longitudinal member; (3) an upper longitudinal horizontal member rigidly fastened to said seat frame, and adapted to ride on said trackway; and (4) independent means for moving said longitudinal member along said trackway, thereby moving said frame horizontally.

References Cited in the file of this patent
UNITED STATES PATENTS

| 1,228,434 | Hedberg | June 5, 1917 |
| 2,809,688 | Brundage | Oct. 15, 1957 |
| 2,886,096 | Eckart et al. | May 12, 1959 |
| 2,920,684 | Fante | Jan. 12, 1960 |

FOREIGN PATENTS

| 513,262 | Great Britain | Oct. 9, 1939 |